(12) United States Patent
Filip (10) Patent No.: US 9,554,060 B2
(45) Date of Patent: Jan. 24, 2017

(54) ZOOM IMAGES WITH PANORAMIC IMAGE CAPTURE

(71) Applicant: Google Inc., Mountain View, CA (US)

(72) Inventor: Daniel Joseph Filip, San Jose, CA (US)

(73) Assignee: Google Inc., Mountain View, CA (US)

( * ) Notice: Subject to any disclaimer, the term of this patent is extended or adjusted under 35 U.S.C. 154(b) by 247 days.

(21) Appl. No.: 14/168,355

(22) Filed: Jan. 30, 2014

(65) Prior Publication Data

US 2015/0213577 A1    Jul. 30, 2015

(51) Int. Cl.
*G09G 5/00* (2006.01)
*H04N 5/262* (2006.01)
*H04N 5/232* (2006.01)
*G06T 3/40* (2006.01)
*G06T 3/00* (2006.01)

(52) U.S. Cl.
CPC ........... *H04N 5/2628* (2013.01); *G06T 3/0012* (2013.01); *G06T 3/4053* (2013.01); *H04N 5/23222* (2013.01); *H04N 5/23238* (2013.01)

(58) Field of Classification Search
None
See application file for complete search history.

(56) References Cited

U.S. PATENT DOCUMENTS

| | | | |
|---|---|---|---|
| 6,075,905 A | 6/2000 | Herman et al. | |
| 6,377,257 B1 | 4/2002 | Borrel et al. | |
| 6,453,056 B2 | 9/2002 | Laumeyer et al. | |
| 6,522,787 B1 | 2/2003 | Kumar et al. | |
| 6,868,192 B2 * | 3/2005 | Takiguchi | G06T 11/60 345/668 |
| 6,956,573 B1 | 10/2005 | Bergen et al. | |
| 7,127,068 B2 | 10/2006 | Sundaravel et al. | |
| 7,359,797 B2 | 4/2008 | Dorfman et al. | |

(Continued)

FOREIGN PATENT DOCUMENTS

| | | |
|---|---|---|
| EP | 2315075 A1 | 4/2011 |
| WO | 2013181032 A2 | 12/2013 |

OTHER PUBLICATIONS

Pages from gawker.com website, article entitled "What Movies Are Currently Playing On Google Street View?" accessed Apr. 24, 2012, 10:28 a.m. (6 pages).

(Continued)

*Primary Examiner* — Ryan R Yang
(74) *Attorney, Agent, or Firm* — Lerner, David, Littenberg, Krumholz & Mentlik, LLP (57) ABSTRACT

In one aspect, one or more computing devices may capture a panoramic image. Panoramic images may refer to images having a field of view which is greater than that of the human eye, e.g., 180 degrees or greater. Some panoramic images may provide a 360-degree view of a location. In response to capturing the panoramic image, the one or more computing devices may provide for display a request for a non-panoramic, for example, a zoomed-in image. A zoomed-in image may be captured. An area of the panoramic image that corresponds to the zoomed-in image is determined by the one or more computing devices. The zoomed-in image is associated with the area by the one or more computing devices. In this regard, the panoramic image and the zoomed-in image may be taken close in time such that the images have the same or similar lighting conditions, scenes, etc.

20 Claims, 11 Drawing Sheets

(56) References Cited

U.S. PATENT DOCUMENTS

| | | |
|---|---|---|
| 8,131,118 B1 | 3/2012 | Jing et al. |
| 8,364,393 B2 | 1/2013 | DeLuca et al. |
| 8,385,591 B1 | 2/2013 | Anguelov et al. |
| 8,447,136 B2 | 5/2013 | Ofek et al. |
| 8,472,664 B1 | 6/2013 | Jing et al. |
| 8,515,207 B2 | 8/2013 | Chau |
| 8,593,485 B1 | 11/2013 | Anguelov et al. |
| 8,605,133 B2 | 12/2013 | Lampotang et al. |
| 8,666,112 B1 | 3/2014 | Jing et al. |
| 8,938,091 B1 | 1/2015 | Anguelov et al. |
| 2003/0191694 A1 | 10/2003 | Vonfeldt et al. |
| 2004/0125133 A1 | 7/2004 | Pea et al. |
| 2005/0162523 A1 | 7/2005 | Darrell et al. |
| 2005/0283730 A1 | 12/2005 | Uyttendaele et al. |
| 2007/0173956 A1 | 7/2007 | Koch et al. |
| 2007/0255725 A1 | 11/2007 | McCoach |
| 2008/0002916 A1 | 1/2008 | Vincent et al. |
| 2008/0106593 A1 | 5/2008 | Arfvidsson et al. |
| 2008/0253685 A1 | 10/2008 | Kuranov et al. |
| 2010/0004995 A1 | 1/2010 | Hickman |
| 2010/0085383 A1* | 4/2010 | Cohen .................. G06T 3/40 345/660 |
| 2010/0118025 A1 | 5/2010 | Smith et al. |
| 2010/0123737 A1 | 5/2010 | Williamson et al. |
| 2010/0141772 A1* | 6/2010 | Inaguma .............. G01S 3/7864 348/169 |
| 2010/0238262 A1* | 9/2010 | Kurtz ................... H04N 7/147 348/14.01 |
| 2010/0293173 A1 | 11/2010 | Chapin et al. |
| 2010/0325589 A1* | 12/2010 | Ofek ................. G06F 3/04815 715/854 |
| 2011/0143779 A1 | 6/2011 | Rowe et al. |
| 2011/0191014 A1* | 8/2011 | Feng ..................... G09G 5/00 701/532 |
| 2011/0234640 A1* | 9/2011 | Ishida ............... G06K 9/00221 345/671 |
| 2011/0267369 A1 | 11/2011 | Olsen |
| 2013/0069944 A1 | 3/2013 | Altman et al. |
| 2013/0155181 A1 | 6/2013 | Williams et al. |
| 2013/0223744 A1 | 8/2013 | Ramanujapuram et al. |
| 2014/0180571 A1 | 6/2014 | Kimchi et al. |
| 2014/0240455 A1* | 8/2014 | Subbian ................ H04N 7/183 348/39 |
| 2015/0138188 A1* | 5/2015 | Gillard ................... G06T 15/00 345/419 |

OTHER PUBLICATIONS

Song, D., Y. Xu, N. Qin, Aligning windows of live video from an imprecise pan-tilt-zoom camera into a remote panoramic display for remote natue observation, J. Real-Time Image Proc (2010) 5:57-70, DOI 10.1007/ s11554-009-0127-z.

Aude Oliva and Antonio Torralba, Building The Gist Of A Scene: The Role Of Global Image Features In Recognition; Progress In Brain Research, vol. 155, 2006 (16 pages).

Hartmut Neven, Geordie Rose and William G. MacReady, Image Recognition With An Adiabatic Quantum Computer: I. Mapping To Quadratic Unconstrained Binary Optimization; Apr. 28, 2008, pp. 1-7.

http://www.gigapan.org/index.php, printed May 4, 2009.

http://www.ogleearth.com/2007/10/earthmine_or_th.html, printed May 4, 2009.

ICCV 2005 Computer Vision Contest, http:/research.microsft.com/en-us/um/people/szelisk/VisionContest . . . , printed May 21, 2012.

Masakatsu Kourogi, Takeshi Kurata, Katsuhiko Sakaue, A Panorama-based Method of Personal Positioning and Orientation and Its Real-time Applications for Wearable Computers, ISWC2001 in Zurich, Switerland, pp. 107-114, 2001.

Masakatsu Kourogi, Takeshi Kurata, Katsuhiko Sakaue, Yoichi Muraoka, Improvement of panorama-based annotation overlay using omnidirectional vision and inertial sensors, 2000, pp. 183-184, IEEE.

* cited by examiner

ZOOM IMAGES WITH PANORAMIC IMAGE CAPTURE

BACKGROUND

Various systems provide users with images of different locations. Some systems provide users with panoramic images or panoramic images having a generally wider field of view. For example, panoramic images may include an image or collection of images having a field of view which is greater than that of the human eye, e.g., 180 degrees or greater. Some panoramic images may provide a 360-degree view of a location.

Some systems may provide users with the ability to "zoom" into a particular part of a panoramic image. These systems may use highlighting, thumbnails, or icons to indicate where zoomed in images are available. These indicators may give users the opportunity to view a panoramic image including a particular feature and subsequently view another image of that particular feature at a greater zoom level.

In order to provide these zoomed in images, the panoramic image must be compared to other images to identify useful zoomed in images. As an example, images from various sources may be compared, based on features, pixels, locations, etc., in order to identify features.

SUMMARY

Aspects of the disclosure provide a method, the method includes receiving, by one or more computing devices, a panoramic image; in response to receiving the panoramic image, providing for display, by the one or more computing devices, a request for a zoomed-in image; receiving, by the one or more computing devices, the zoomed-in image; determining, by the one or more computing devices, an area of the panoramic image that corresponds to the zoomed-in image; and associating, by the one or more computing devices, the zoomed-in image with the area of the panoramic image.

In one example, the method also includes receiving a request to display the panoramic image; receiving user input identifying the area of the panoramic image; and in response to receiving the user input, providing the zoomed-in image for display. In another example, the method also includes receiving user input identifying a desired area of the panoramic image, and determining the area of the panoramic image is based on the received user input of the desired area. In another example, the method also includes receiving user input drawing a box relative to the panoramic image, and wherein determining the area of the panoramic image is based on the received user input of the drawing of the box. In another example, the one or more computing devices comprise a client computing device. In another example, the method also includes sending the panoramic image, the zoomed-in image, and the association to a server computing device. In another example, the method also includes receiving user input adjusting the area of the panoramic image, and wherein the zoomed-in image is associated with the adjusted area.

Other aspects of the disclosure provide a system. The system includes one or more computing devices configured to receive a panoramic image; in response to capturing the panoramic image, provide for display, a request for a zoomed in image; receive the zoomed-in image; determine an area of the panoramic image that corresponds to the zoomed-in image; and associate the zoomed-in image with the area.

In one example, the one or more computing devices are also configured to receive a request to display the panoramic image; receive user input identifying the area of the panoramic image; and in response to receiving the user input, provide the zoomed-in image for display. In another example, the one or more computing devices are also configured to receive user input identifying a desired area of the panoramic image, and to determine the area of the panoramic image based on the received user input of the desired area. In another example, the one or more computing devices are also configured to receive user input drawing a box relative to the panoramic image, and determining the area of the panoramic image is based on the received user input of the drawing of the box. In another example, the one or more computing devices comprise a client computing device. In another example, the one or more computing devices are further configured to send the panoramic image, the zoomed-in image, and the association to a server computing device. In another example, the one or more computing devices are further configured to receive user input adjusting the area of the panoramic image, and the zoomed-in image is associated with the adjusted area.

Further aspects of the disclosure provide a non transitory, tangible recording medium on which instructions are stored. The instructions when executed by one or more processors cause the one or more processors to perform a method. The method includes receiving a panoramic image; in response to capturing the panoramic image, providing for display a request for a zoomed-in image; receiving the zoomed in image; determining an area of the panoramic image that corresponds to the zoomed-in image; and associating the zoomed-in image with the area.

In one example, the method also includes receiving a request to display the panoramic image; receiving user input identifying the area of the panoramic image; and in response to receiving the user input, providing the zoomed-in image for display. In another example, the method also includes receiving user input identifying a desired area of the panoramic image, and determining the area of the panoramic image is based on the received user input of the desired area. The medium of claim 15, wherein the method further comprises receiving user input drawing a box relative to the panoramic image, and determining the area of the panoramic image is based on the received user input of the drawing of the box. In another example, the method also includes sending the panoramic image, the zoomed-in image, and the association to a server computing device. In another example, the method also includes receiving user input adjusting the area of the panoramic image, and the zoomed-in image is associated with the adjusted area.

DETAILED DESCRIPTION

Overview

The technology relates generally to providing users with the ability to associate zoomed-in images with panoramic images, (sometimes referred to as a "panorama"). For example, a user may capture a panoramic image on his or her client computing device (such as a mobile phone). Once this is done, the client computing device may display a prompt asking the user whether he or she would like to add any non-panoramic image, such as zoomed-in images, to the panoramic image. The user may then capture a zoomed-in image. In one example, the user may specifically select a point or area within the panoramic image and confirm that the zoomed-in image should be associated with that point. Alternatively, the point or area may be determined automatically using computer vision techniques (e.g. feature matching). Later, the user (or another user) may then select the point or area within the panoramic image and, in response, receive the zoomed-in image based on the association.

The user may select the point or area before or after the zoomed-in image is captured. For example, the user may select a point by tapping on a display of the mobile phone with a finger or stylus, or by using a mouse pointer or other input technique. An area may be selected by drawing a box corresponding to the area of the zoomed-in image. In this second example, it may be simpler for the user to draw a box if the user has already captured the zoomed-in image. In another example, the user may drag the zoomed-in image over the corresponding area in the panoramic image.

If the area is determined automatically using computer vision techniques, the user may also be able to correct or move any improperly placed zoomed-in images using any of the techniques described above.

The panoramic image and any zoomed-in images may then be sent to various other computing devices in order to be shared with other users. As an example, the panoramic image may be uploaded to a server computing device, which can provide the panoramic image and zoomed-in images in response to requests from other user client computing devices.

By allowing the user to capture zoomed-in images immediately or shortly after a panoramic image is captured, there is a greater likelihood that the zoomed-in image may be properly placed relative to the panoramic image. In addition, the zoomed-in images are more likely to have similar lighting conditions and features if they are captured proximate in time to the panoramic image. As an example, if a panoramic image is an outdoor scene of people and monuments, the same people may still be positioned within the zoomed-in image as in the panoramic image with the same or similar lighting conditions. In this regard, when the user views the panoramic image, he or she may select the point associated with the zoomed-in image. In response, the display may transition from the panoramic image to the zoomed-in image, making the transition appear more natural to a user than two images that were taken at different times, by different devices, etc.

Example Systems

Figure 1:
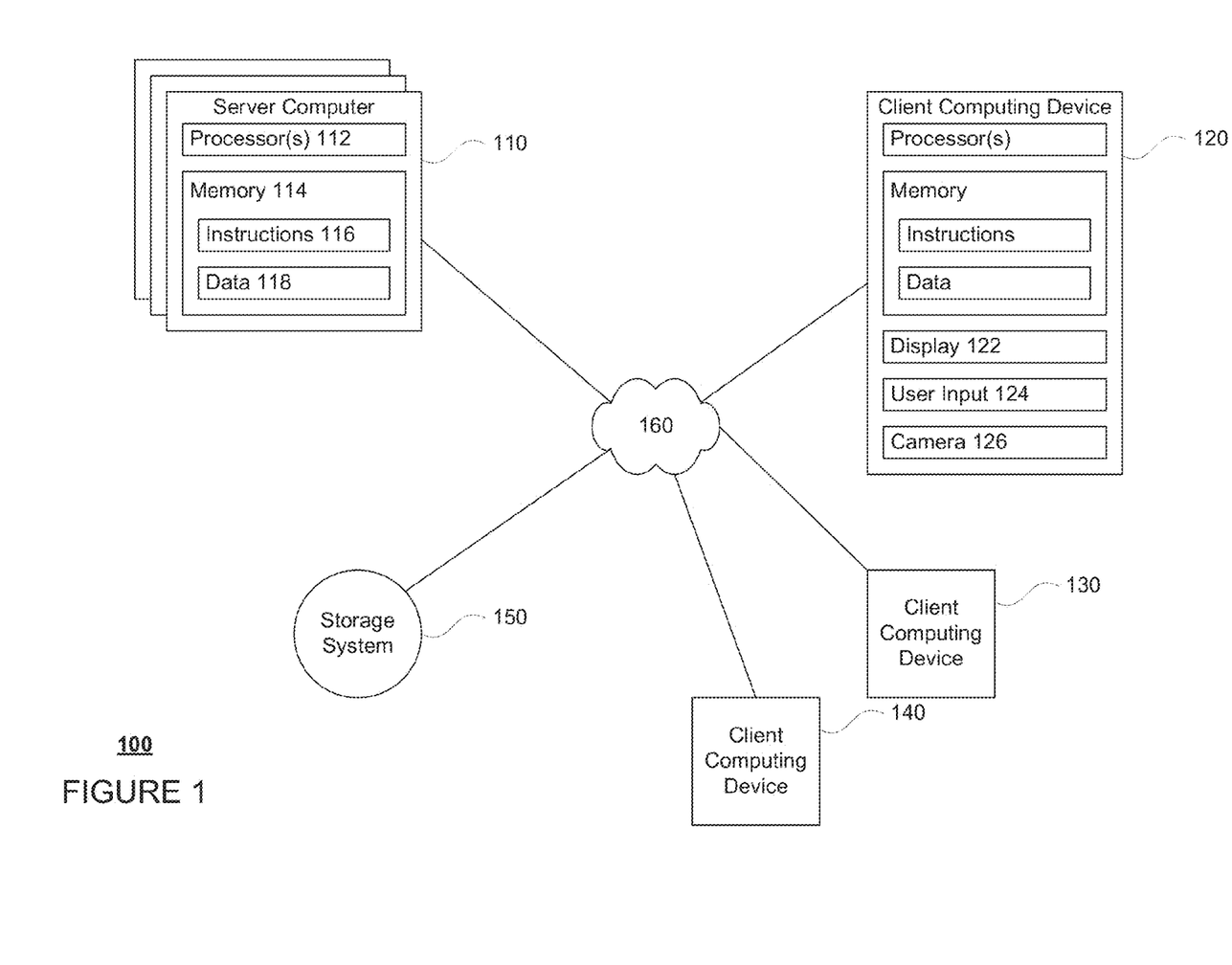
FIG. 1 is a functional diagram of an example system in accordance with aspects of the disclosure.
Figure 2:
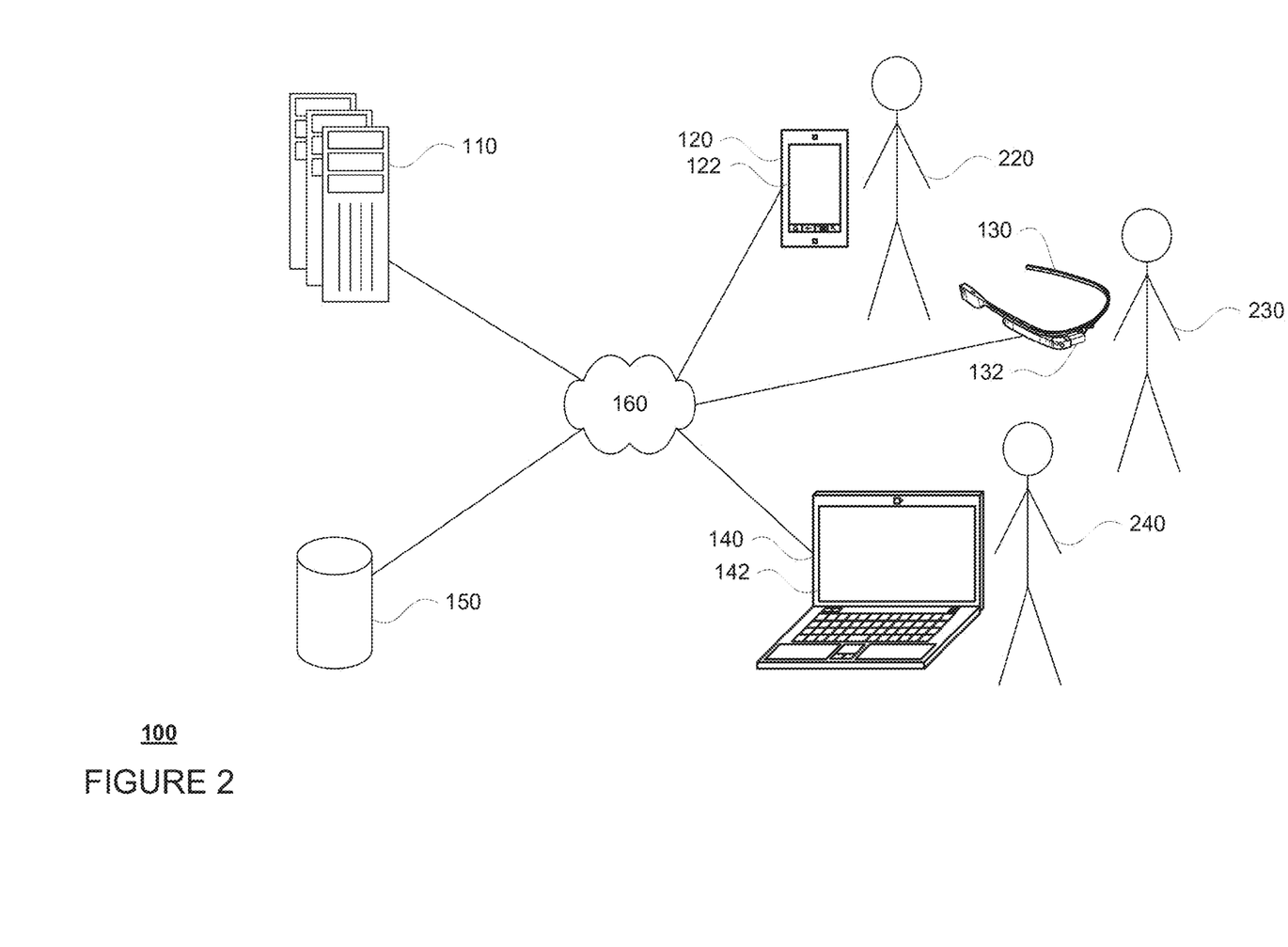
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of the network 160 and capable of directly and indirectly communicating with other nodes of the network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store panoramic images, zoomed-in images, and any associations between these images received from client devices as described in more detail below. In some instances, the panoramic images and zoomed-in images may be associated with data such as date, location, and time of capture, camera characteristics such as the type of device or shutter speed, etc. As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices that may be physically located at the same or different geographic locations. Storage system 150 may be connected to the computing devices via the network 160 as shown in FIG. 1 and/or may be directly connected to or incorporated into any of the computing devices 110-140 (not shown).

Example Methods

Figure 3:
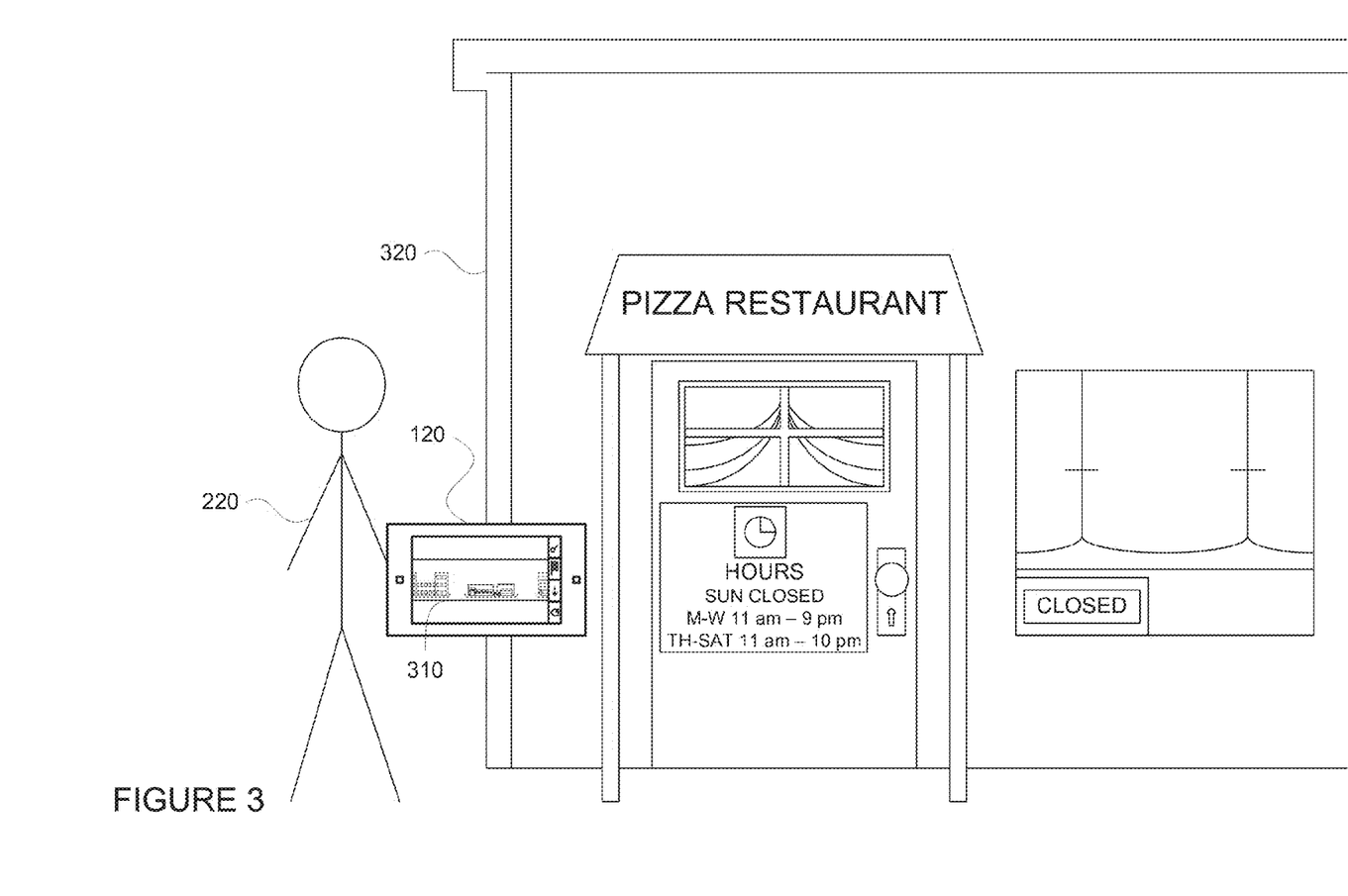
FIG. 3 is an example of a user capturing a panoramic image using a computing device in accordance with aspects of the disclosure.

In order to take advantage of the techniques described herein, the user may install an application on his or her device, select a setting on the device, and/or the like. After this, the client computing device, in conjunction with the application, may allow a user to capture a panoramic image. For example, as shown in FIG. 3, user 220 uses client device 120 to capture a panoramic image 310. In this example, the panoramic image includes portions of building 320.

Figure 4:
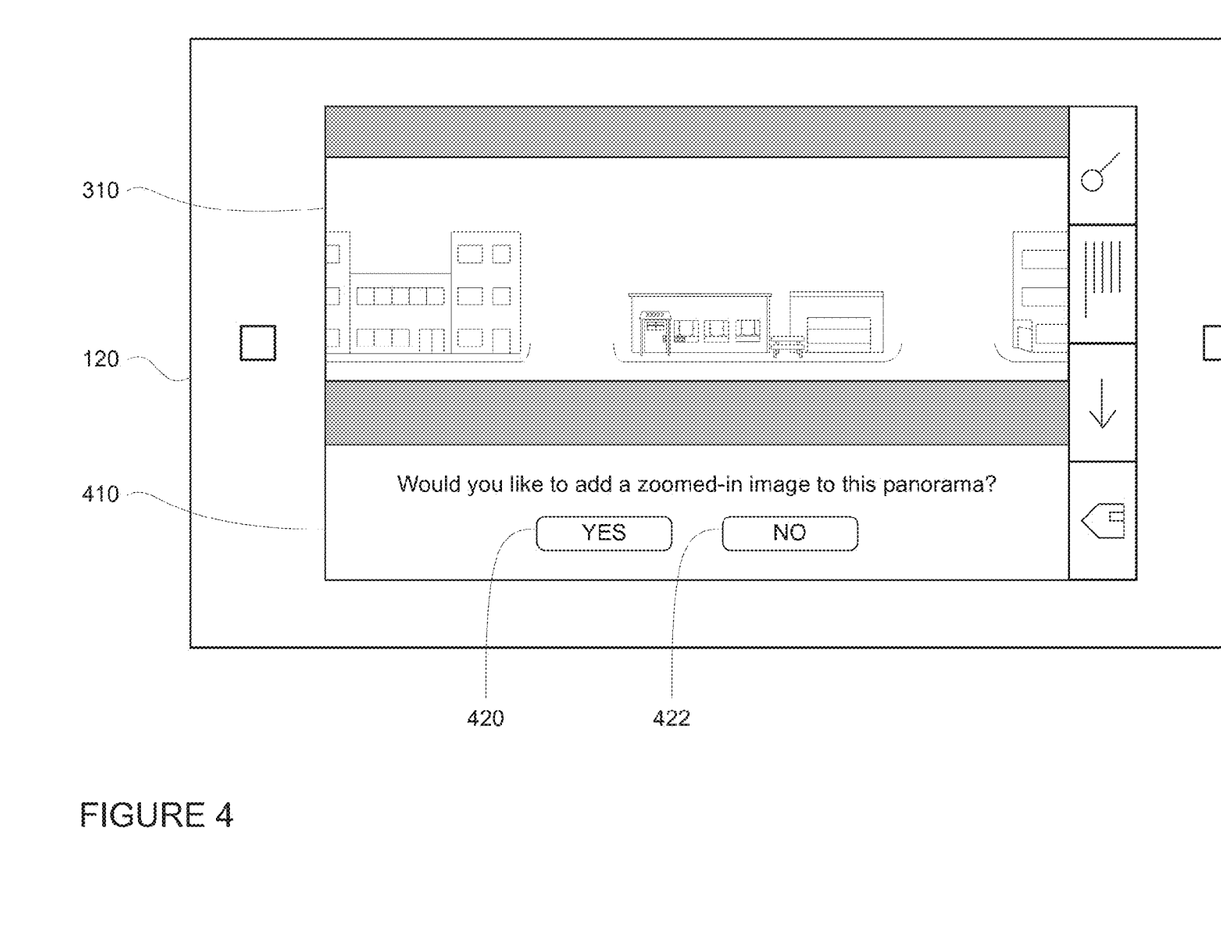
FIG. 4 is an example screen shot and computing device in accordance with aspects of the disclosure.

Once the user has captured a panoramic mage, the client device may allow the user to take additional images. As an example, the client computing device may display a prompt asking the user whether he or she would like to add or capture another non-panoramic image. FIG. 4 is an example of such a prompt 410. In this example, prompt 410 displayed on client computing device 120 asks whether the user would like to add a zoomed-in image to the panoramic image. In this example, the user is provided with two options, a yes button 420 and a no button 422. If the user selects the no button 422, the user may be able to capture additional panoramic images, view the panoramic image 310, etc. If the user selects the yes button, the user may be able to capture a zoomed-in image.

In the example of FIG. 4, the non-panoramic image is a zoomed-in image. As used herein, a zoomed-in image includes at least one feature of the panoramic image that appears (or is) to be located closer to the client computing device than in the panoramic image. In this regard, the user may use a zoom function (optical or digital) of the client computing device and/or may simply move closer to the feature in order to capture further details of that feature. Thus, using an optical zoom function and/or moving closer to the feature will provide the zoomed-in image with greater detail for at least the feature than the panoramic image.

Figure 5:
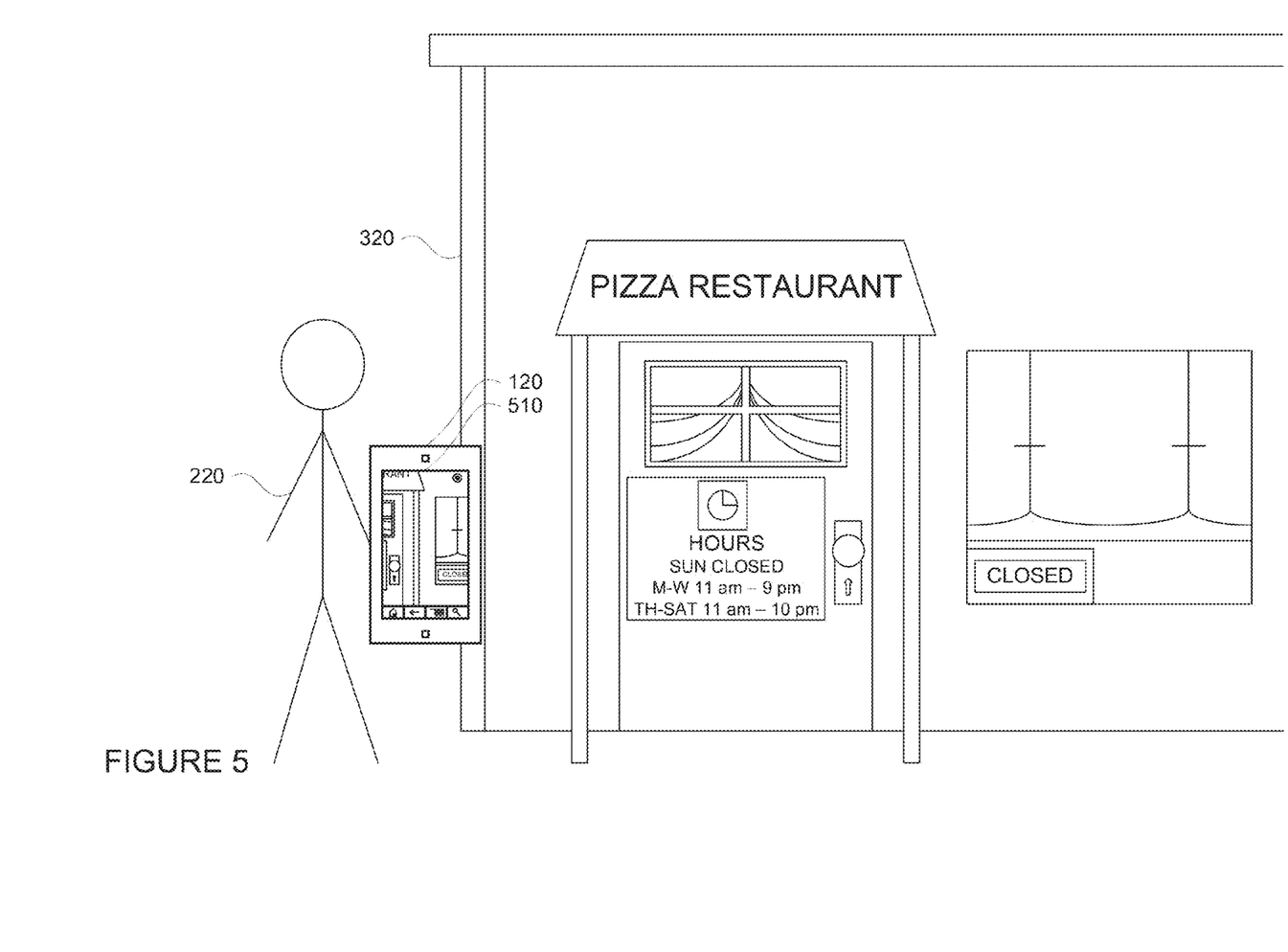
FIG. 5 is an example of a user capturing a zoomed in image using a computing device in accordance with aspects of the disclosure.

FIG. 5 is an example of user 220 capturing a zoomed-in image 510 using client device 120. In this example, the zoomed-in image 510 includes part of building 320 at a greater zoom level than in panoramic image 310. As noted above, user 220 may have moved the client computing device 120 closer to the building 320 or may have used an optical or digital zoom function of the camera of the client computing device.

The non-panoramic image may then be associated with a particular point or area of the panoramic image. This may be performed automatically, for example, by using computer vision techniques in order to identify common features between the two images. Alternatively, the user may specifically select a point or area within the panoramic image and confirm that the zoomed-in image should be associated with that point or area.

Figure 6:
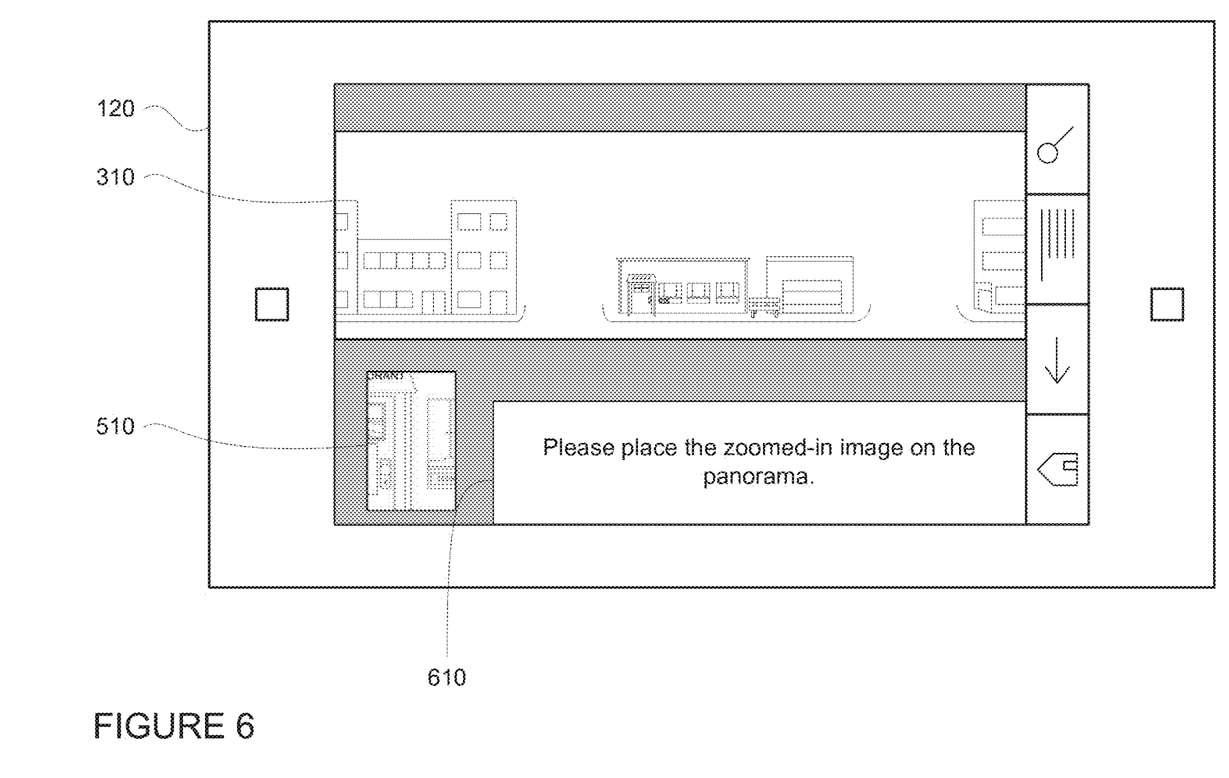
FIG. 6 is another example screen shot and computing device in accordance with aspects of the disclosure.

A user may select a point or area in various ways. In order to assist the user in this task, the client computing device may display another prompt. FIG. 6 illustrates an example of a prompt 610 which asks a user to place a zoomed-in image on the panoramic image. In response, the user may identify a particular point in the panoramic image for the non-panoramic image with a finger or stylus (if the client computing device includes a touch screen) or with a mouse pointer (if the client computing device includes user input controls for a mouse pointer).

Figure 7:
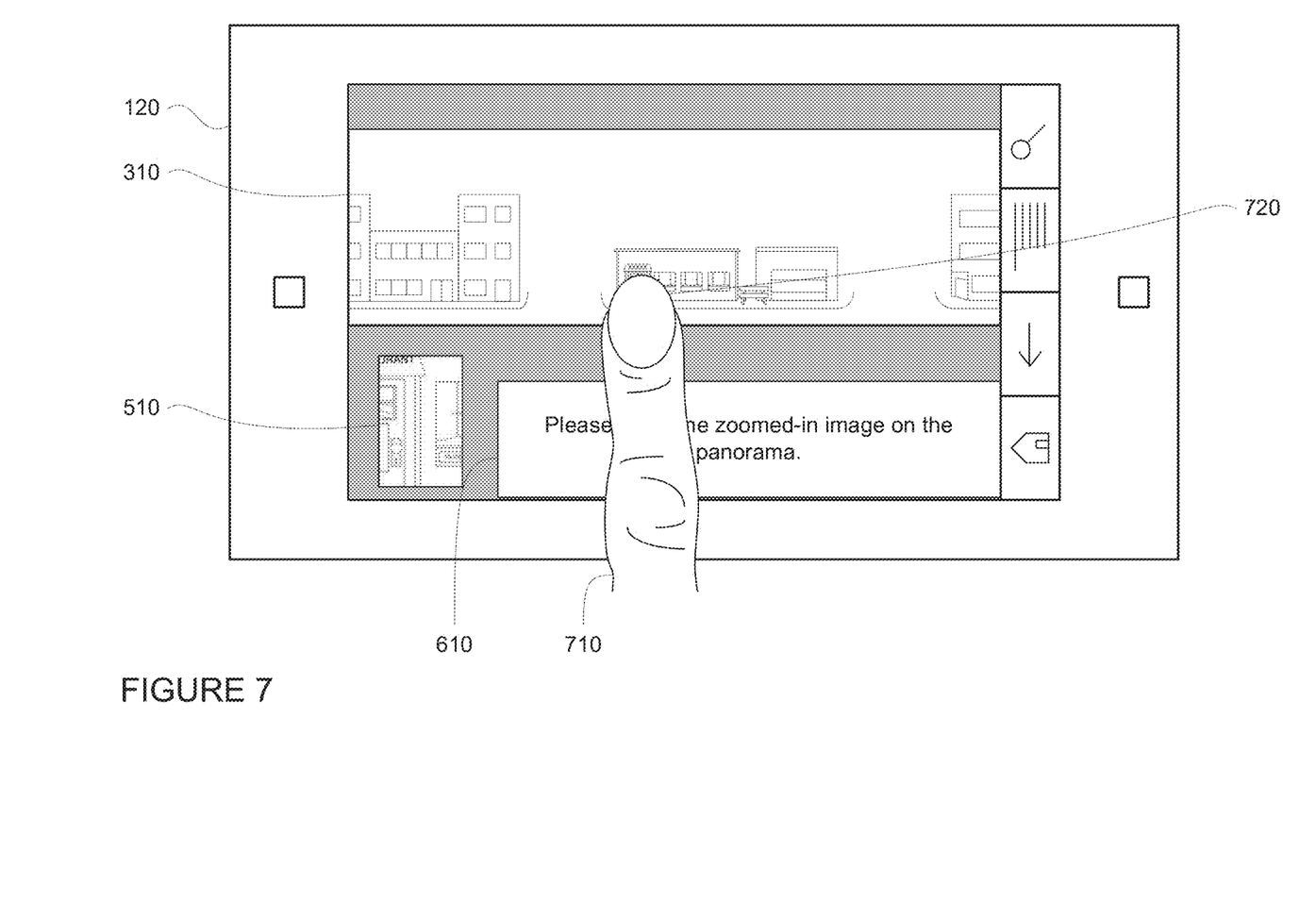
FIG. 7 is an example screen shot, computing device and user input in accordance with aspects of the disclosure.
Figure 8:
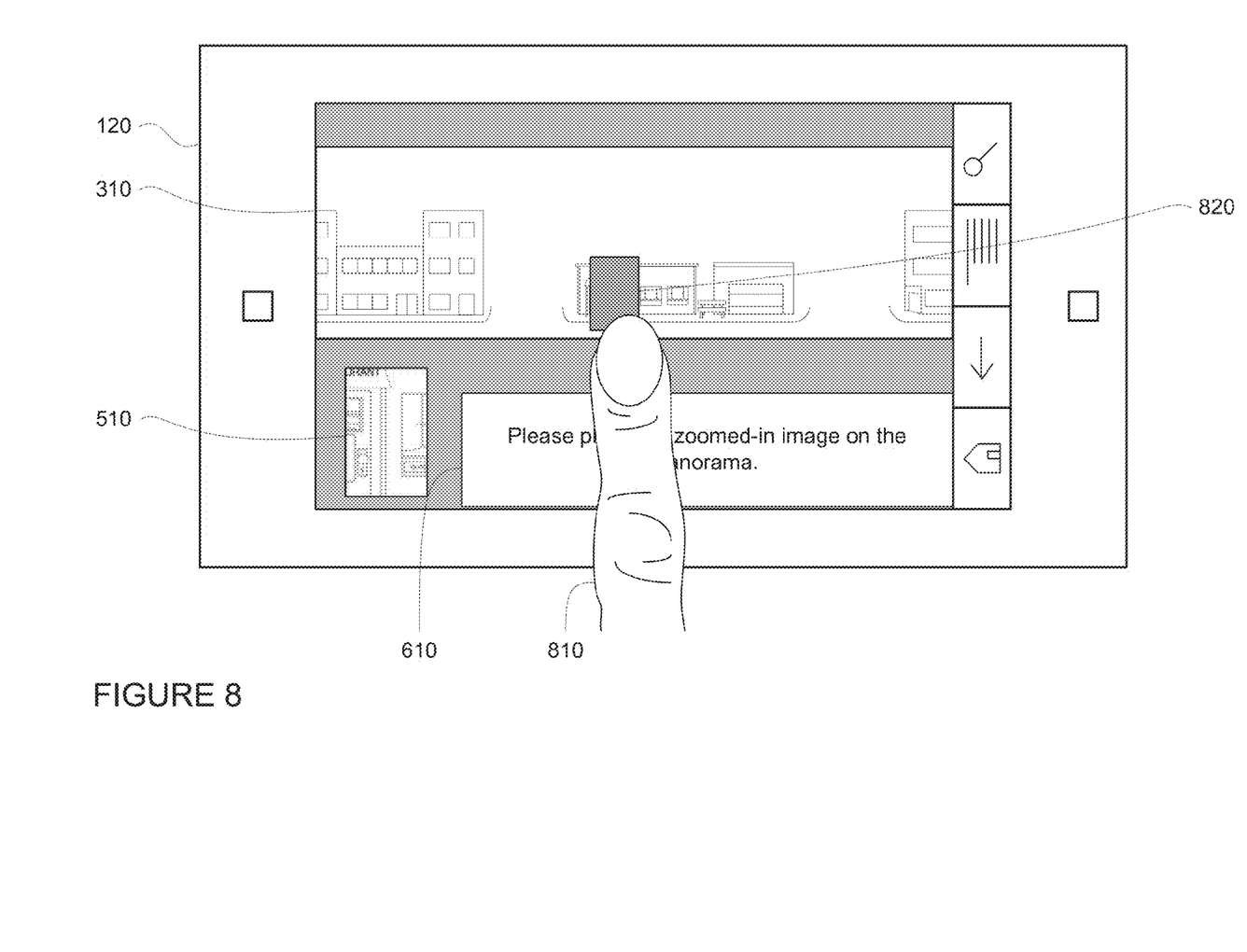
FIG. 8 is another example screen shot, computing device and user input in accordance with aspects of the disclosure.
Figure 9:
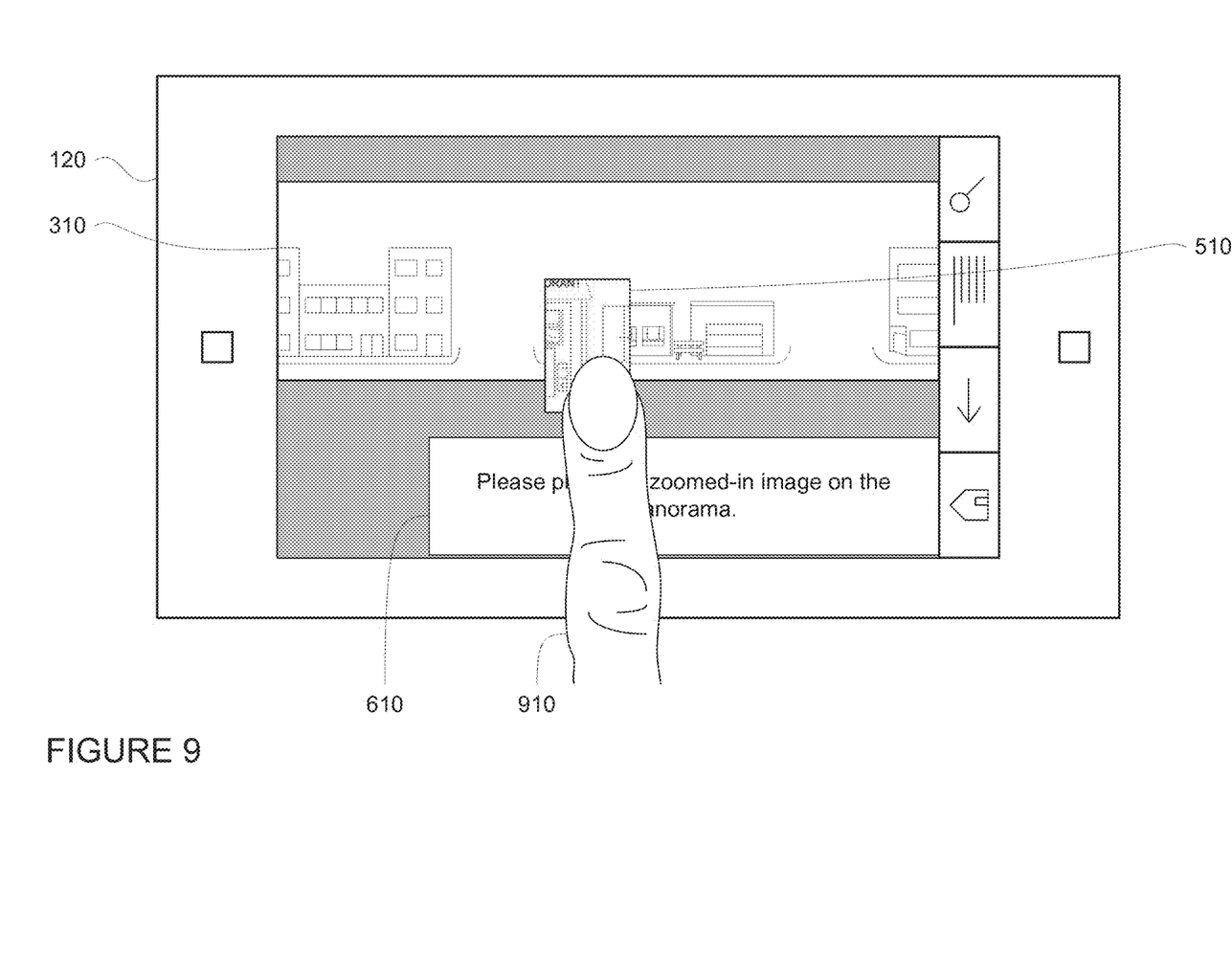
FIG. 9 is a further example screen shot, computing device and user input in accordance with aspects of the disclosure.

Examples of selection techniques are shown in FIGS. 7-9, though other selection methods may also be used. For instance, as shown in FIG. 7, as client computing device 120 includes a touch screen display, user 220 may use a finger 710 (or a stylus) to tap a point or area 720 (located under FIG. 710) of the panoramic image 310 corresponding to the relative location of zoomed-in image 510. As another example, in FIG. 8, user 220 may use a finger 810 (or a stylus) to draw a box around an area 820 of the panoramic image 310 corresponding to the relative location of zoomed-in image 510. In yet another example, in FIG. 9, user may use a finger 910 (or a stylus) to tap and drag zoomed-in image 510 to an area of panoramic image 310 corresponding to the relative location of zoomed-in image 510.

If the point or area of the panoramic image corresponding to the non-panoramic image is determined automatically using computer vision techniques, the user may also be able to correct or move any improperly placed non-panoramic images using any of the techniques described above. In addition, although in the example above the user may select the point or area after the non-panoramic image is captured, the user may also do so before the non-panoramic image is captured.

The selected point or area may be used to generate an association or link between the panoramic image and the non-panoramic image. For example, returning to the examples of FIGS. 7-9, once the point or area of the panoramic image has been selected by the user, this point may be associated with the non-panoramic image, such that the client computing device is able to retrieve the non-panoramic image based on the identification or selection of the point or area associated with the panoramic image. Thus, the association identifies the panoramic image, the non-panoramic image, and the selected point or area. The panoramic image, the non-panoramic image, and the association may be stored in local storage of the client computing device. Alternatively or in addition to being stored locally, if the user would like to share the panoramic image and the non-panoramic image with other uses, the panoramic image, the non-panoramic image, and the association may be set to a server computing device, such as one or more of the server computing devices 110 for storage in a storage system such as storage system 150.

Although the examples above describe capturing and associating only a single non-panoramic image with a panoramic image, one or more additional non-panoramic images may also be captured. For instance, the aspects discussed above with regard to the examples of FIGS. 4-9 may be repeated in order to capture additional non-panoramic images and select points or areas of association.

The user may then switch between a display of the panoramic image and any non-panoramic images using the stored association or associations. As noted above, the user may identify the point or area in the panoramic image associated with a non-panoramic image with a finger or stylus or with a mouse pointer. In response, the client computing device may display the associated non-panoramic image.

Figure 10:
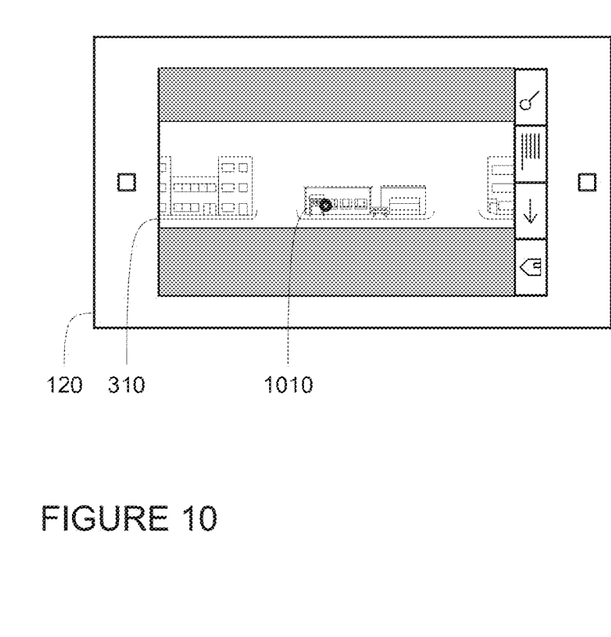
FIG. 10 is a further example screen shot and computing device in accordance with aspects of the disclosure.

In order to do so, the client computing device may use an association to display the panoramic image in a way that communicates to a user that a non-panoramic image associated with a point or area of the panoramic image is available for display to the user. For example, as shown in FIG. 10, client computing device 120 includes a display of panoramic image 310. In this example, panoramic image 310 includes an indicator 1010 identifying to the user that the panoramic image is associated with a non-panoramic image related to the location of the indicator relative to the panoramic image. In this example, the indicator 1010 is a circle, however various other types of indicators such as a thumbnail image of the associated non-panoramic image, an outline of the area of an association, a flashing circle, etc. may also be used. Again, although only one indicator is shown in the example of FIG. 10, additional indicators may also be displayed if there are additional associations and non-panoramic images associated with a displayed panoramic image.

Figure 11:
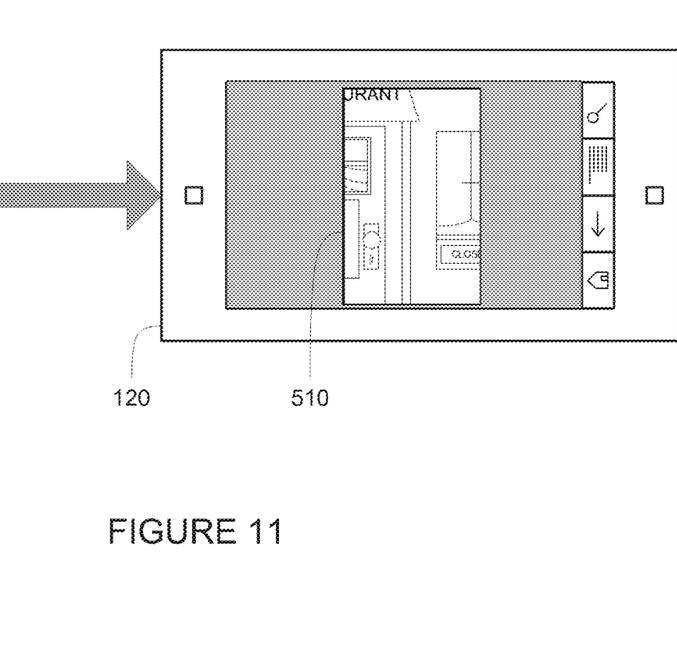
FIG. 11 is an example screen shot and computing device in accordance with aspects of the disclosure.

In the example of FIG. 10, once the user selects the indicator 1010, in response, the client computing device may display the non-panoramic image associated with the indicator 1010 as shown in FIG. 11. Thus, between FIGS. 10 and 11, once the user selects the indicator 1010, the client computing device's display may transition between a display of panoramic image 310 (as shown in FIG. 10) to a display of zoomed-in image 510 (as shown in FIG. 11).

As noted above, the panoramic image, the non-panoramic images, and the associations may be sent to one or more server computing devices for storage. In this regard, the user may share the panoramic image, the non-panoramic image, and the association with other users. As such, other users or the same user may use a client computing device to request the panoramic image from one or more of the server computing devices 110. In response, the one or more server computing devices may retrieve the panoramic image and any associations and associated non-panoramic images from the storage system 150 and send them to the requesting client computing device for display to that user. As with the examples of FIGS. 10 and 11, the client computing devices may use the associations to display one or more indicators with the panoramic image and the display of the client computing device may transition between a panoramic image and a non-panoramic image based a user's selection of the indicator.

Although the aspects described herein are described as being performed by a single client computing device, any of the aspects described herein may be performed in conjunction with one or more server computing devices. For example, once the user has captured a panoramic image using a client computing device, the user may upload the panoramic image to one or more server computing devices. The client computing device may respond, for example, by displaying a prompt such as in the example of FIG. 6. Similarly, once a user has captured a panoramic image and a non-panoramic image, the server computing device may respond by instructing the client computing device to prompt the user to identify any associations between the two images.

Figure 12:
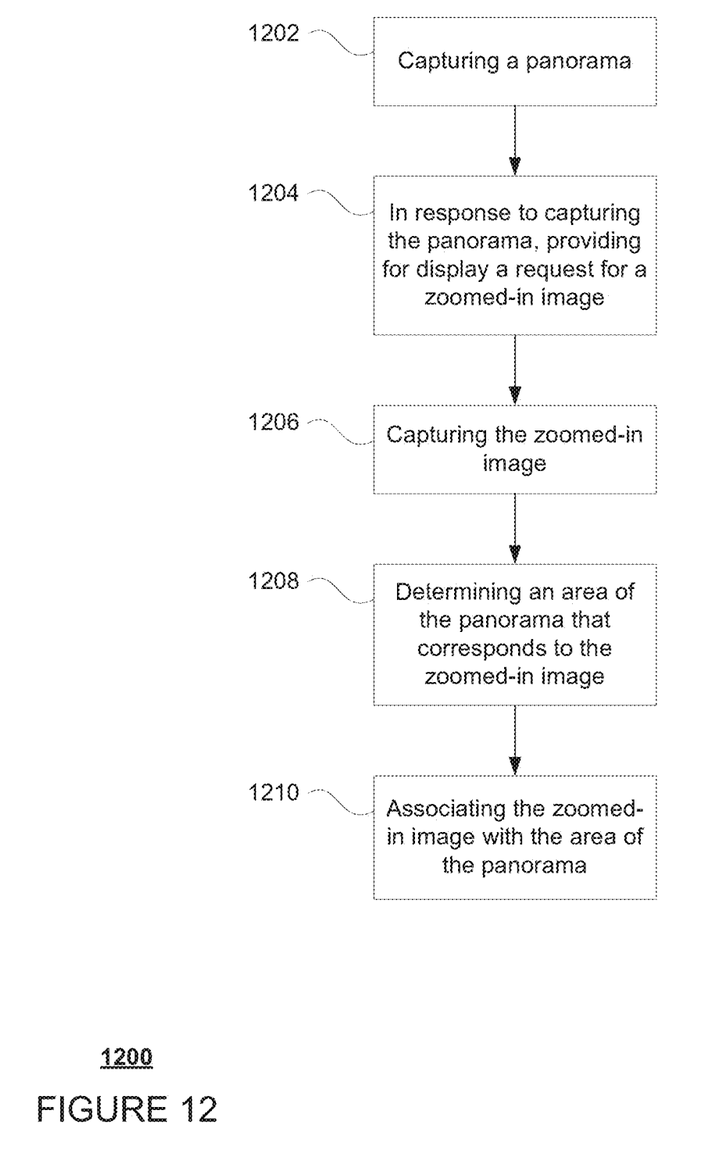
FIG. 12 is a flow diagram related to capturing and associating zoomed-in images with panoramic images in accordance with aspects of the disclosure.

Flow diagram 1200 of FIG. 12 is an example of some of the aspects described above which may be performed by one or more processors of a client computing device and/or one or more server computing devices as noted above. For instance, a panoramic image is captured at block 1202. In response to capturing the panoramic image, a request for a zoomed-in image is provided for display at block 1204. The zoomed-in image is captured at block 1206. A point or an area of the panoramic image that corresponds to the zoomed-in image is determined at block 1208. As noted above, this determination may be performed based on a user selection. The zoomed-in image is then associated with the point or area of the panoramic image at block 1210.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   receiving, by one or more computing devices, a panoramic image of a three-dimensional scene captured by a user using a camera;
   in response to receiving the panoramic image, providing for display on an interface to the user, by the one or more computing devices, a request for the user to have the camera capture a new zoomed-in image of the same three-dimensional scene related to the panoramic image, wherein the request is provided in order to increase a likelihood that the new zoomed-in image and the panoramic image will be captured under a same ambient lighting condition;
   receiving, by the one or more computing devices, the new zoomed-in image captured by the camera in response to the request;
   determining, by the one or more computing devices, an area of the panoramic image that corresponds to the new zoomed-in image; and
   associating, by the one or more computing devices, the zoomed-in image with the area of the panoramic image.

2. The method of claim 1, further comprising:
   receiving a request to display the panoramic image;
   receiving user input identifying the area of the panoramic image; and
   in response to receiving the user input, providing the new zoomed-in image for display.

3. The method of claim 1, further comprising receiving user input identifying a desired area of the panoramic image, and wherein determining the area of the panoramic image is based on the received user input of the desired area.

4. The method of claim 1, further comprising receiving user input drawing a box relative to the panoramic image, and wherein determining the area of the panoramic image is based on the received user input of the drawing of the box.

5. The method of claim 1, wherein the one or more computing devices comprise a client computing device.

6. The method of claim 1, further comprising sending the panoramic image, the new zoomed-in image, and the association to a server computing device.

7. The method of claim 1, further comprising receiving user input adjusting the area of the panoramic image, and wherein the new zoomed-in image is associated with the adjusted area.

8. The method of claim 1, wherein the request is provided in order to increase a likelihood that a person appearing in both the new zoomed-in image and the panoramic image will appear at a same position in both the new zoomed-in image and the panoramic image.

9. A system comprising one or more computing devices each having on or more processors, the one or more computing devices being configured to:
   receive a panoramic image of a three-dimensional scene captured by a user using a camera;
   in response to receiving the panoramic image, provide for display on an interface to the user, a request for the user to have the camera capture a new zoomed-in image of the same three-dimensional scene related to the panoramic image, wherein the request is provided in order to increase a likelihood that the zoomed-in image and the panoramic image will be captured under a same ambient lighting condition;
   receive the new zoomed-in image captured by the camera in response to the request;
   determine an area of the panoramic image that corresponds to the new zoomed-in image; and
   associate the new zoomed-in image with the area.

10. The system of claim 9, wherein the one or more computing devices are further configured to:
    receive a request to display the panoramic image;
    receive user input identifying the area of the panoramic image; and
    in response to receiving the user input, provide the new zoomed-in image for display.

11. The system of claim 9, wherein the one or more computing devices are further configured to receive user input identifying a desired area of the panoramic image, and to determine the area of the panoramic image based on the received user input of the desired area.

12. The system of claim 9, wherein the one or more computing devices are further configured to receive user input drawing a box relative to the panoramic image, and determining the area of the panoramic image is based on the received user input of the drawing of the box.

13. The system of claim 9, wherein the one or more computing devices are further configured to receive user input adjusting the area of the panoramic image, and the new zoomed-in image is associated with the adjusted area.

14. A method comprising:
    receiving, by one or more computing devices, a panoramic image of a three-dimensional scene captured by a user using a camera;
    in response to receiving the panoramic image, providing for display on an interface to the user, by the one or more computing devices, a request for the user to have the camera capture a new zoomed-in image of the same three-dimensional scene related to the panoramic image, wherein the request is provided in order to increase a likelihood that a person appearing in both the new zoomed-in image and the panoramic image will appear at a same position in both the new zoomed-in image and the panoramic image;

receiving, by the one or more computing devices, a new zoomed-in image captured by the camera in response to the request;

determining, by the one or more computing devices, an area of the panoramic image that corresponds to the new zoomed-in image; and associating, by the one or more computing devices, the zoomed-in image with the area of the panoramic image.

15. The method of claim 14, further comprising:
receiving a request to display the panoramic image;
receiving user input identifying the area of the panoramic image; and
in response to receiving the user input, providing the new zoomed-in image for display.

16. The method of claim 14, further comprising receiving user input identifying a desired area of the panoramic image, and wherein determining the area of the panoramic image is based on the received user input of the desired area.

17. The method of claim 14, further comprising receiving user input drawing a box relative to the panoramic image, and wherein determining the area of the panoramic image is based on the received user input of the drawing of the box.

18. The method of claim 14, wherein the one or more computing devices comprise a client computing device.

19. The method of claim 14, further comprising sending the panoramic image, the new zoomed-in image, and the association to a server computing device.

20. The method of claim 14, further comprising receiving user input adjusting the area of the panoramic image, and wherein the new zoomed-in image is associated with the adjusted area.

* * * * *